United States Patent
Joshi et al.

(10) Patent No.: US 8,584,464 B2
(45) Date of Patent: Nov. 19, 2013

(54) GAS TURBINE ENGINE ASSEMBLY AND METHOD OF ASSEMBLING SAME

(75) Inventors: Narendra Digamber Joshi, Cincinnati, OH (US); Michael Eugene Michael, Cincinnati, OH (US); Michael Joseph Reale, Milford, OH (US)

(73) Assignee: General Electric Company, Schenectady, NY (US)

( * ) Notice: Subject to any disclaimer, the term of this patent is extended or adjusted under 35 U.S.C. 154(b) by 1070 days.

(21) Appl. No.: 11/312,225

(22) Filed: Dec. 20, 2005

(65) Prior Publication Data

US 2007/0137216 A1    Jun. 21, 2007

(51) Int. Cl.
*F02C 1/00* (2006.01)
*F02C 6/04* (2006.01)

(52) U.S. Cl.
USPC ................. 60/726; 60/728; 60/785

(58) Field of Classification Search
USPC ............. 60/728, 726, 788, 782, 785
See application file for complete search history.

(56) References Cited

U.S. PATENT DOCUMENTS

| | | | | |
|---|---|---|---|---|
| 1,052,588 A * | 2/1913 | Janicki | ............. | 60/39.27 |
| 3,796,045 A * | 3/1974 | Foster-Pegg | ........ | 60/772 |
| 3,919,852 A * | 11/1975 | Jones | ................. | 62/7 |
| 4,949,544 A | 8/1990 | Hines | | |
| 5,117,625 A * | 6/1992 | McArthur et al. | ......... | 60/785 |
| 5,321,944 A * | 6/1994 | Bronicki et al. | ......... | 60/775 |
| 5,537,822 A | 7/1996 | Shnaid et al. | | |
| 5,553,448 A | 9/1996 | Farrell et al. | | |
| 5,622,044 A * | 4/1997 | Bronicki et al. | .......... | 60/39.182 |
| 5,669,217 A | 9/1997 | Anderson | | |
| 5,680,752 A * | 10/1997 | Skog | ................. | 60/772 |
| 5,722,229 A * | 3/1998 | Provost | ............... | 60/785 |
| 5,722,241 A | 3/1998 | Huber | | |
| 5,724,806 A | 3/1998 | Horner | | |
| 5,778,675 A | 7/1998 | Nakhamkin | | |
| 6,003,298 A * | 12/1999 | Horner | .......... | 60/39.182 |
| 6,038,849 A * | 3/2000 | Nakhamkin et al. | ........ | 60/775 |
| 6,050,082 A | 4/2000 | Leonard et al. | | |
| 6,308,512 B1 | 10/2001 | Kopko | | |
| 6,530,224 B1 | 3/2003 | Conchieri | | |
| 6,789,000 B1 * | 9/2004 | Munson, Jr. | ............. | 700/287 |
| 6,935,831 B2 | 8/2005 | Joshi | | |
| 7,007,484 B2 | 3/2006 | Stegmaier et al. | | |
| 7,065,953 B1 * | 6/2006 | Kopko | ............. | 60/39.3 |
| 7,513,120 B2 | 4/2009 | Kupratis | | |

(Continued)

FOREIGN PATENT DOCUMENTS

DE    4410440 A1    8/1995
EP    0293206    11/1988

(Continued)

OTHER PUBLICATIONS

US 6,182,450, 02/2001, Horner (withdrawn).

(Continued)

*Primary Examiner* — Gerald L Sung
(74) *Attorney, Agent, or Firm* — Armstrong Teasdale LLP

(57) ABSTRACT

A method for assembling a gas turbine engine assembly includes providing a core gas turbine engine including a high-pressure compressor, a combustor, and a high-pressure turbine, and coupling a low-pressure compressor between the core gas turbine engine and a motor such that the low-pressure compressor is driven only by the motor.

16 Claims, 2 Drawing Sheets

(56) References Cited

U.S. PATENT DOCUMENTS

| | | |
|---|---|---|
| 2003/0057704 A1* | 3/2003 | Baten et al. .................. 290/3 |
| 2005/0099075 A1* | 5/2005 | Roslund et al. ............. 310/85 |
| 2005/0235625 A1 | 10/2005 | Gericke et al. |
| 2006/0010714 A1* | 1/2006 | Carin et al. ................. 34/514 |
| 2007/0130952 A1* | 6/2007 | Copen .......................... 60/772 |
| 2008/0272040 A1* | 11/2008 | Nordlund et al. ........... 210/171 |
| 2009/0051167 A1* | 2/2009 | Dinu ............................ 290/52 |

FOREIGN PATENT DOCUMENTS

| | | |
|---|---|---|
| EP | 1206634 A1 | 5/2002 |
| EP | 1245805 A2 | 10/2002 |
| EP | 1591644 A1 | 11/2005 |
| EP | 1712761 A2 | 10/2006 |
| JP | 2002349286 A | 12/2002 |
| JP | 2003286807 A | 10/2003 |
| JP | 2003529701 A | 10/2003 |
| JP | 2006291948 A | 10/2006 |
| WO | 0100975 A1 | 1/2001 |

OTHER PUBLICATIONS

European Search Report issued in connection with EP Application No. 06126642.5, Feb. 4, 2011.

An English language translation of JP Office Action for co-pending JP patent application No. 2006-342782 (2 pgs).

A Japanese language Office Action for co-pending JP patent applicatino No. 2006-342782 (2 pgs).

\* cited by examiner

GAS TURBINE ENGINE ASSEMBLY AND METHOD OF ASSEMBLING SAME

BACKGROUND OF THE INVENTION

This invention relates generally to gas turbine engines, and more specifically to methods and apparatus for operating gas turbine engines.

At least one gas turbine engine includes in serial flow arrangement, a low-pressure compressor, a high-pressure compressor for compressing air channeled from the low-pressure compressor, a combustor in which fuel is mixed with the compressed air and ignited to form a high temperature gas stream, and a high-pressure turbine coupled to the high-pressure compressor. The high-pressure compressor, combustor and high-pressure turbine are sometimes collectively referred to as the core engine. Moreover, at least one known gas turbine engine includes an intermediate turbine coupled to the low-pressure compressor, and a free or power turbine that is driven by gases discharged from the high and intermediate pressure turbines.

During operation, air is compressed by the low-pressure compressor and collected by a plurality of pipes and scrolls and then channeled through an intercooler that is coupled remotely from the gas turbine engine. The cooled air is then channeled back to the high-pressure compressor through another set of pipes and scrolls. The high-pressure turbine drives the high-pressure compressor through a shaft. The intermediate pressure turbine drives the low-pressure compressor through a second shaft and the power turbine drives a load, e.g. a generator, through a third shaft.

However, since the gas turbine engine includes three separate shafts, and also includes a plurality of pipes and scrolls to channel the compressed air from the low-pressure compressor to the intercooler and then back to the high-pressure compressor, the gas turbine engine is relatively complex, and therefore requires additional time and costs to manufacture.

BRIEF DESCRIPTION OF THE INVENTION

In one aspect, a method for assembling a gas turbine engine assembly is provided. The method includes providing a core gas turbine engine including a high-pressure compressor, a combustor, and a high-pressure turbine, and coupling a low-pressure compressor between the core gas turbine engine and a motor such that the low-pressure compressor is driven only by the motor.

In another aspect, a gas turbine engine assembly is provided. The gas turbine engine assembly includes a core gas turbine engine comprising a high-pressure compressor, a combustor, and a high-pressure turbine, and a motor, and a low-pressure compressor coupled between the core gas turbine engine and the motor such that the low-pressure compressor is driven only by the motor.

DETAILED DESCRIPTION OF THE INVENTION

Figure 1:
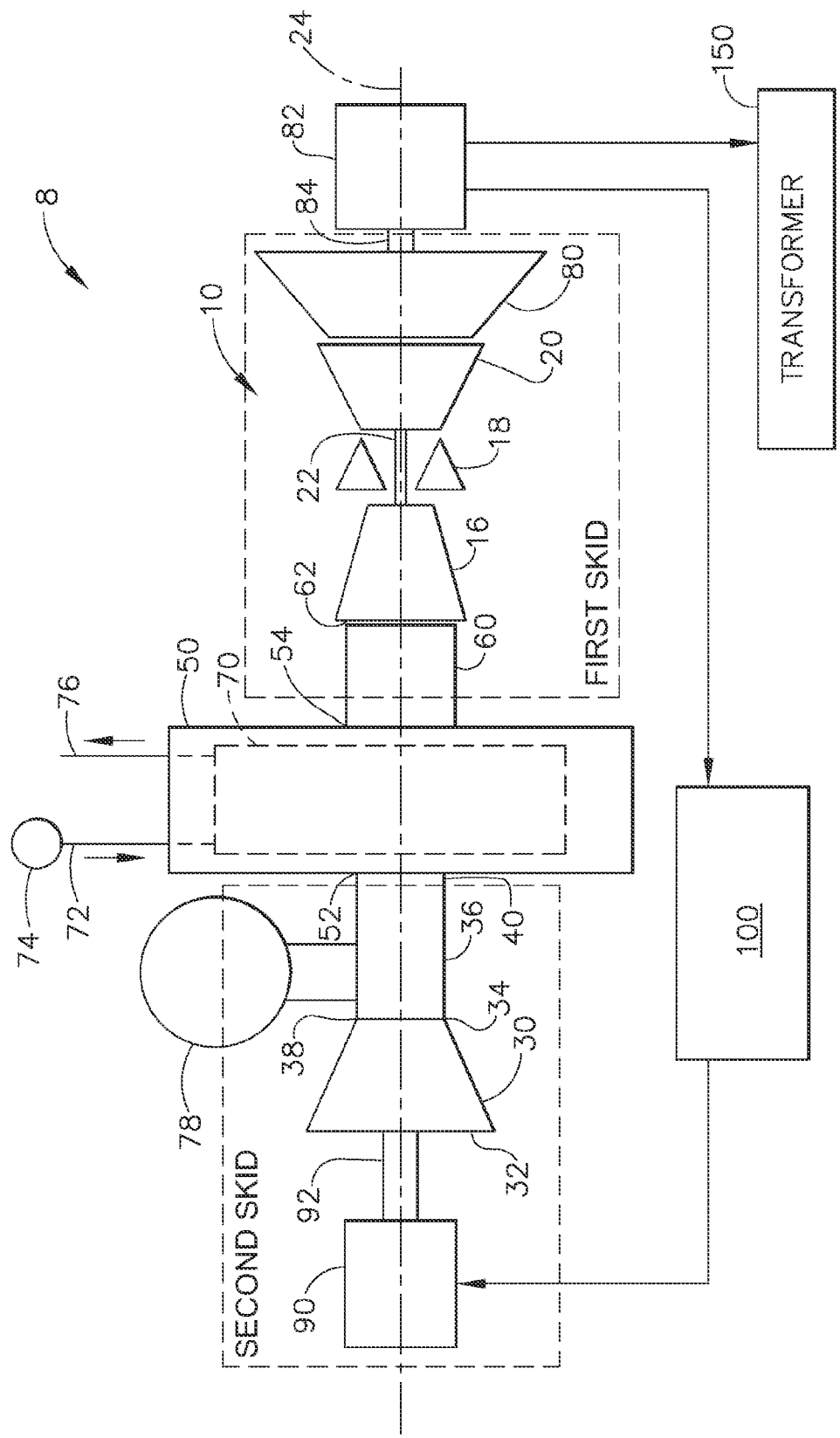
FIG. 1 is a block diagram of an exemplary gas turbine engine assembly.

FIG. 1 is a block diagram of an exemplary gas turbine engine assembly 8 including a core gas turbine engine 10. Core gas turbine engine 10 includes, in serial flow relationship, a high-pressure compressor 16, a combustor 18, and a high-pressure turbine 20. High-pressure turbine 20 is coupled to high-pressure compressor 16 with a first rotor shaft 22 that is substantially coaxially aligned with respect to a longitudinal centerline axis 24 of core gas turbine engine 10. In one embodiment, core gas turbine engine 10 is an LMS 100 core gas turbine engine.

Gas turbine engine assembly 8 also includes a low-pressure compressor or booster 30 having an inlet 32 and an outlet 34, and a booster duct 36 having an inlet 38 and an outlet 40. In the exemplary embodiment, booster duct 36 is coupled axially downstream from booster compressor 30 such that air discharged from booster compressor outlet 34 is channeled directly into booster duct inlet 38. Moreover, booster duct 36 is substantially coaxially aligned with respect to a longitudinal centerline axis 24 of core gas turbine engine 10.

Gas turbine engine assembly 8 also includes an intercooler 50 having an airflow inlet 52 and an airflow outlet 54, and a high-pressure compressor inlet duct 60 having an inlet 62 and an outlet 64. In the exemplary embodiment, intercooler 50 is coupled axially downstream from booster duct 36 such that air discharged from booster duct outlet 40 is channeled directly into intercooler inlet 52.

In the exemplary embodiment, airflow that is discharged from low-pressure compressor 30 is channeled through intercooler 50 for additional cooling prior to the cooled air being channeled to high-pressure compressor 16. Accordingly, and in the exemplary embodiment, intercooler 50 includes a heat exchanger 70 that has a working fluid inlet 72 that is coupled in flow communication with a pump 74 that is utilized to channel a working fluid through heat exchanger 70, and a working fluid outlet 76 that is utilized to discharge the working fluid from heat exchanger 70. Although only heat exchanger 70 is described herein, it should be realized that intercooler 50 may include a plurality of heat exchangers 70 housed therein.

In the exemplary embodiment, cooled airflow discharged from intercooler 50 is channeled directly into high-pressure compressor duct 60 via inlet 62, and then directly into high-pressure compressor 16 via outlet 62. Accordingly, booster duct 36 is configured to channel airflow directly into intercooler 50 and high-pressure compressor inlet duct 60 is configured to channel cooled airflow directly from intercooler 50 into high-pressure compressor 16. As such, a plurality of known pipes and scrolls that are configured to channel the compressed air from the low-pressure compressor to the intercooler and then back to the high-pressure compressor, are eliminated.

Gas turbine engine assembly 8 further includes at least one variable bypass valve (VBV) 78 that is coupled in flow communication with booster duct 36 and configured to discharge airflow from booster duct 36 to atmosphere during predetermined operational conditions. In the exemplary embodiment, VBV 78 is utilized to control the quantity of air flowing from low-pressure compressor 30 to high-pressure compressor 16. More specifically, VBV 78 facilitates matching the output airflow from low-pressure compressor 30 to the input airflow requirements of high-pressure compressor 16.

Gas turbine engine assembly 8 further includes a free or power turbine 80 that is coupled axially aft of high-pressure turbine 20, a generator 82, and a shaft 84 that is utilized to couple power turbine 80 to generator 82. During operation, the combustion gases discharged from high-pressure turbine 20 are utilized to drive power turbine 80 and thus generator 82 via shaft 84.

Gas turbine engine assembly 8 further includes a motor 90 that is coupled to low-pressure compressor 30 via a shaft 92, and a control system 100 that is utilized to control motor 90 and thus a rotational speed of low-pressure compressor 30.

Figure 2:
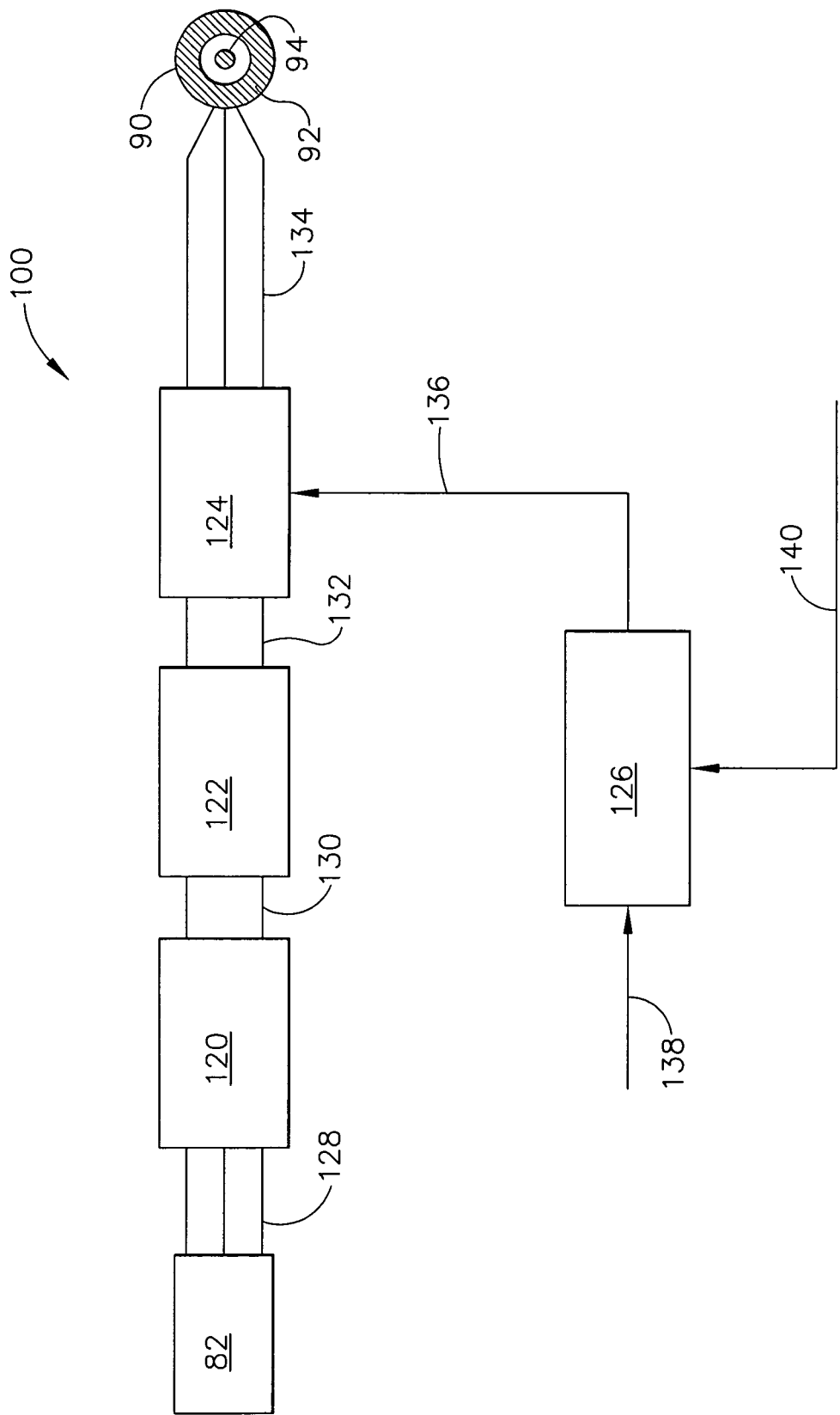
FIG. 2 is a block diagram of an exemplary variable frequency drive (VFD) that may be used with the gas turbine engine assembly shown in FIG. 1.

FIG. 2 is a block diagram of gas turbine engine control system 100 shown in FIG. 1. In the exemplary embodiment, motor 90 is a variable frequency motor, and control system 100 is a variable frequency drive (VFD) that is utilized to vary a speed and/or frequency of motor 90. In the exemplary embodiment, VFD 100 includes a diode bridge rectifier 120, a direct current (DC) filter circuit 122, an inverter 124, and a control regulator 126. VFD 100 uses pulse width modulation (PWM) to control electric motor 90. Motor 90 includes a stator 92 and a rotor 94. Rotor 94 includes a plurality of high energy density permanent magnets (not shown) that induce a magnetic field. The PWM features enable the magnitude of stator 92 voltage and frequency to be varied via inverter 124. Varying the voltage and frequency of transmitted power to stator 92 controls the speed and torque of rotor 94.

In use, rectifier 120 receives a three-phase, alternating current (AC) input signal 128 as the primary power input from generator 82 for powering stator 92. Rectifier 120 rectifies AC signal 128 into a DC signal 130 that may include high frequency components in addition to a DC component. DC signal 130 is received by filter circuit 122 that removes the high frequency components and transmits a filtered, smooth DC output signal 132 to inverter 124. Regulator 126 processes a plurality of reference signals 138 and a plurality of feedback signals 140 and generates signal 136. In one embodiment reference signals 138 are indicative of desired motor rotor 94 speed, and feedback signals 140 are indicative of actual motor rotor 94 speed. Alternate embodiments for signals 138 and 140 may include stator current, rotor position, and stator frequency in lieu of or in addition to motor rotor speed, or optionally, the mass flow rate of the airflow channeled into high-pressure compressor 16.

Inverter 124 receives a plurality of input control signals 136 from regulator 126. Control signals 136 include a plurality of commands that control inverter 124. Inverter 124 modifies signal 132 based on received signals 136 to generate a plurality of output pulses 134 that are transmitted to stator 92 by modulating signal 134 voltage pulse width and frequency to stator 92 thereby adjusting the electromagnetic field of stator 92 as necessary to maintain a predetermined voltage-to-frequency ratio. The output torque generated by the interaction of the magnetic fields of stator 92 and rotor 94 is transmitted to rotor 94. The output torque transmitted to rotor 94 is translated into rotation of rotor 94 wherein the modulation of torque to rotor 94 controls the speed of rotor 94. Regulator 126 calculates stator 92 winding voltage pulse width and frequency to operate motor 90 at a desired speed. The power signal 134 transmitted to stator 92 from inverter 124 increases with lengthened pulse widths that subsequently increases motor 90 output torque and speed of rotor 94. Although an exemplary variable frequency motor 90 and variable frequency drive 100 are described herein, it should be realized that gas turbine engine assembly 8 may utilize a wide variety of variable speed motors and controllers to facilitate driving low-pressure compressor 30.

During operation, core gas turbine engine 10 is started. More specifically, a high-pressure compressed air is channeled from high-pressure compressor 16 into combustor 18 wherein the compressed air is mixed with fuel and ignited. The fuel-air mixture is ignited to raise the temperature and energy level of the pressurized air. The high energy combustion products flow to high-pressure turbine 20 for driving compressor 16, via drive shaft 22, and then to low-pressure turbine 80 to facilitate driving generator 82 via shaft 84.

Power output from generator 82 is transmitted to a transformer 150 to be utilized to drive various electrical components, and also to VFD 100 to drive variable frequency motor 90. More specifically, low-pressure compressor 30 is not driven by core gas turbine engine 10, but rather is driven by motor 90 via shaft 92, VFD 100 is utilized to facilitate varying the speed of motor 90 and thus the speed of low-pressure compressor 30.

Low-pressure compressor 30 then generates compressed airflow that is channeled into booster duct 36. In one embodiment, the airflow is then channeled into intercooler 50. Optionally, a portion of the airflow is channeled to exhaust via VBV 78 to facilitate maintaining the desired airflow-pressure as discussed above. The airflow if then channeled from the intercooler, through inlet duct 60, and into high-pressure compressor 16.

The above-described gas turbine engine assembly includes a core gas turbine engine and a variable frequency electric motor configured to drive the low-pressure compressor. As such, the low-pressure compressor is not driven by an intermediate turbine coupled axially aft of the core gas turbine engine as currently known, rather low-pressure compressor is driven by an electric motor that is powered from a generator driven by the core gas turbine engine via a power turbine. As a result, the low-pressure compressor and the VFD motor may be constructed on a separate skids, aligned, and shipped fully functional from the factory to an end user.

Moreover, the gas turbine engine assembly described herein includes an intercooler that is substantially concentrically aligned with a centerline axis of the core gas turbine engine. As such, the compressed air to and/or from the intercooler is routed through a circular pipe, also aligned substantially concentrically with the engine centerline axis, into the high-pressure compressor. As such, the airflow is channeled from the low-pressure compressor along a path that is aligned substantially along the engine centerline axis to the high-pressure compressor. As a result, the additional pipes and scrolls that are utilized in at least one known gas turbine engine to redirect the airflow to and/or from a remote eliminating the air wrapper.

Additionally, the gas turbine engine assembly described herein, does not include an intermediate turbine or a turbine midframe since the low-pressure compressor is driven using the variable frequency motor. Thus the design complexity is reduced, by reducing the quantity of drive shafts, which may result in reduced costs to fabricate the gas turbine engine assembly. Moreover, the high-pressure compressor, the high-pressure turbine and the power turbine may be mounted on a second skid.

As a result, the cost of manufacturing the engine described herein may be substantially reduced by utilizing the variable frequency drive motor to drive the low-pressure compressor. Moreover, the compressor scrolls, the booster drive shaft, the intermediate pressure turbine, and the turbine mid-frame are all eliminated. Additionally, by coupling the intercooler axially between the low-pressure turbine and the high-pressure turbine results in a significant reduction in compressed air volume between the low-pressure compressor and the high-pressure compressors, and thus a decreased volume of flow that is vented to atmosphere at loss of load transient. Moreover, since the low-pressure compressor is decoupled from the turbine, the low-pressure turbine may be operated at a rotational speed that is different than a rotational speed of the core gas turbine engine or the power turbine.

Exemplary embodiments of a gas turbine engine assembly are described above in detail. The gas turbine engine assembly is not limited to the specific embodiments described herein, but rather, components of the system may be utilized independently and separately from other components described herein. Specifically, the variable frequency electric motor described herein may be utilized on a wide variety of gas turbine engines.

While the invention has been described in terms of various specific embodiments, those skilled in the art will recognize that the invention can be practiced with modification within the spirit and scope of the claims.

What is claimed is:

1. A method for assembling a gas turbine engine assembly, said method comprising: providing a first skid including: a core gas turbine engine including a high-pressure compressor, a combustor, and a high-pressure turbine; and a turbine generator including a power turbine rotatably coupled to an electrical generator such that the power turbine drives the electrical generator; providing a second skid including a low pressure compressor, a variable bypass valve, and a variable frequency motor, wherein each of the first and second skids is configured to be shipped; coupling the variable bypass valve between the low-pressure compressor and the core gas turbine engine to facilitate controlling a quantity of air by discharging airflow from the low-pressure compressor to the atmosphere during predetermined operational conditions; coupling an intercooler between the low-pressure compressor and the core gas turbine engine to facilitate channeling air along a path that is aligned substantially along a centerline axis of the core gas turbine engine; coupling the electrical generator to the variable frequency motor such that the variable frequency motor is driven by the electrical generator; and coupling the low-pressure compressor between the core gas turbine engine and the variable frequency motor such that the low-pressure compressor is driven only by the motor to facilitate supplying compressed air to the high-pressure compressor.

2. A method in accordance with claim 1, wherein coupling the intercooler between the low-pressure compressor and the core gas turbine engine facilitates reducing a volume of air between the low-pressure compressor and the high-pressure compressor.

3. A method in accordance with claim 2 further comprising coupling a booster duct between the low-pressure compressor and the intercooler such that the booster duct is substantially concentrically aligned with a centerline axis of the core gas turbine engine.

4. A method in accordance with claim 3 further comprising coupling the variable bypass valve in flow communication with the booster duct and upstream of the intercooler to facilitate controlling a quantity of air flowing from the low-pressure compressor to the high-pressure compressor by matching an output airflow from the low-pressure compressor to an input airflow requirement of the high-pressure compressor.

5. A method in accordance with claim 3 further comprising coupling a high-pressure compressor inlet duct between the intercooler and the high-pressure compressor such that the inlet duct is substantially concentrically aligned with a centerline axis of the core gas turbine engine.

6. A method in accordance with claim 1 further comprising coupling a variable frequency drive system to the motor to facilitate varying a rotational speed of the motor.

7. A method in accordance with claim 1 further comprising coupling a variable frequency drive system to the motor to facilitate varying a rotational speed of the low-pressure compressor.

8. A method in accordance with claim 1 further comprising:
coupling a variable frequency drive system to the motor to facilitate varying a rotational speed of the low-pressure compressor; and
transmitting power from the generator to the variable frequency drive system to facilitate driving the motor.

9. A gas turbine engine assembly comprising:
a first skid comprising a core gas turbine engine comprising a high-pressure compressor, a combustor, and a high-pressure turbine and a turbine generator coupled to said core gas turbine engine, said turbine generator including a power turbine rotatably coupled to an electrical generator such that the power turbine drives the electrical generator; and
a second skid comprising a variable frequency motor, a low-pressure compressor, and a variable bypass valve, wherein said electrical generator is coupled to said variable frequency motor such that said variable frequency motor is driven by said electrical generator, said low-pressure compressor coupled between said core gas turbine engine and said motor such that said low-pressure compressor is driven only by said motor to facilitate supplying compressed air to said high-pressure compressor, wherein said variable bypass valve is coupled between said low-pressure compressor and said core gas turbine engine to facilitate controlling a quantity of air by discharging airflow to the atmosphere during predetermined operational conditions, wherein each of the first and second skids is configured to be shipped.

10. A gas turbine engine assembly in accordance with claim 9 further comprising an intercooler coupled between said low-pressure compressor and said core gas turbine engine, said intercooler substantially concentrically aligned with a centerline axis of said core gas turbine engine.

11. A gas turbine engine assembly in accordance with claim 10 further comprising a booster duct coupled between said low-pressure compressor and said intercooler such that said booster duct is substantially concentrically aligned with a centerline axis of said core gas turbine engine.

12. A gas turbine engine assembly in accordance with claim 11, wherein said variable bypass valve is coupled in flow communication with said booster duct and upstream of said intercooler, said variable bypass valve configured to control a quantity of air flowing from the low-pressure compressor to the high-pressure compressor by matching an output airflow from the low pressure compressor to an input airflow requirement of the high-pressure compressor.

13. A gas turbine engine assembly in accordance with claim 11 further comprising a high-pressure compressor inlet duct coupled between said intercooler and said high-pressure compressor such that said inlet duct is substantially concentrically aligned with a centerline axis of said core gas turbine engine.

14. A gas turbine engine assembly in accordance with claim 9 further comprising a variable frequency drive system coupled to said motor, said drive system configured to vary a rotational speed of said motor.

15. A gas turbine engine assembly in accordance with claim 9 further comprising a variable frequency drive system coupled to said motor, said drive system configured to vary a rotational speed of said low-pressure compressor.

16. A gas turbine engine assembly in accordance with claim 9 further comprising:
a variable frequency drive system coupled to said motor to facilitate varying a rotational speed of said low-pressure compressor, said generator configured to transmit power to said variable frequency drive system to facilitate driving said motor.

* * * * *